United States Patent
Kang et al.

(10) Patent No.: US 11,035,508 B2
(45) Date of Patent: Jun. 15, 2021

(54) CONNECTION STRUCTURE OF TURBO CHARGER AND INTERCOOLER FOR VEHICLE

(71) Applicants: Hyundai Motor Company, Seoul (KR); Kia Motors Corporation, Seoul (KR)

(72) Inventors: Seung Jae Kang, Seoul (KR); Won Rok Choi, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 415 days.

(21) Appl. No.: 16/174,628

(22) Filed: Oct. 30, 2018

(65) Prior Publication Data

US 2019/0331266 A1    Oct. 31, 2019

(30) Foreign Application Priority Data

Apr. 27, 2018 (KR) .......... 10-2018-0049359

(51) Int. Cl.
*F16L 21/08* (2006.01)
*F01P 11/12* (2006.01)
*F02B 33/40* (2006.01)

(52) U.S. Cl.
CPC .......... *F16L 21/08* (2013.01); *F01P 11/12* (2013.01); *F02B 33/40* (2013.01); *F01P 2060/02* (2013.01)

(58) Field of Classification Search
CPC ........ F16L 21/08; F01P 11/12; F01P 2060/02; F02B 33/40
USPC .......................................... 60/602
See application file for complete search history.

(56) References Cited

FOREIGN PATENT DOCUMENTS

| JP | 4280577 B2 | 6/2009 | |
|---|---|---|---|
| KR | 10-0513618 B1 | 9/2005 | |
| KR | 100513618 B1 * | 9/2005 | ............. Y02T 10/12 |
| KR | 10-2017-0079035 A | 7/2017 | |

* cited by examiner

*Primary Examiner* — J. Todd Newton
(74) *Attorney, Agent, or Firm* — Morgan, Lewis & Bockius LLP

(57) ABSTRACT

A connection structure of a turbocharger and an intercooler for a vehicle is disclosed. The turbocharger is configured to compress intake air using exhaust gas and includes an outlet for discharging the compressed air, and the intercooler includes an inlet connected to the outlet of the turbocharger and is configured to receive the compressed air through the inlet. An inserting portion having an external diameter smaller than an external diameter of the outlet is formed at an end portion of the outlet facing the intercooler, and is inserted into the inlet of the intercooler. An connecting hose encloses external circumferences of the outlet and the inlet such that the outlet and the inlet are connected to each other through the connecting hose.

15 Claims, 3 Drawing Sheets

CONNECTION STRUCTURE OF TURBO CHARGER AND INTERCOOLER FOR VEHICLE

CROSS-REFERENCE TO RELATED APPLICATION

The present application claims priority to Korean Patent Application No. 10-2018-0049359 filed on Apr. 27, 2018, the entire contents of which is incorporated herein for all purposes by this reference.

BACKGROUND OF THE INVENTION

Field of the Invention

The present invention relates to a connection structure of a turbocharger and an intercooler for a vehicle. More particularly, the present invention relates to a connection structure of a turbocharger and an intercooler for a vehicle which prevents vibration and noise occurring at an engine from being directly transmitted to the intercooler and prevents flow noise by compressed air from being directly emitted to a hose connecting the turbocharger and the intercooler.

Description of Related Art

Generally, a vehicle is provided with a turbocharger for increasing engine output. The turbocharger includes a turbine and a compressor. The turbine is rotated by energy of exhaust gas discharged from the engine, and the compressor connected to the turbine intakes/compresses air. The compressed air is supplied to the engine.

The compressed air rapidly compressed by the turbocharger expands because temperature of the compressed air rises. Therefore, density of oxygen in the compressed air is lowered, resultantly lowering combustion efficiency.

Therefore, the turbocharger cools the compressed air of high temperature using an intercooler.

In the instant case, the density of oxygen increases and suction volumetric efficiency of cylinders also increases. Furthermore, fuel economy as well as combustion efficiency may be improved and carbon dioxide emission may be greatly reduced.

In the meantime, to prevent vibration of the engine from being directly transmitted to the intercooler, a hose is used to a connection portion of the turbocharger ad the intercooler.

At the instant time, to prevent interference between the turbocharger and the intercooler, the turbocharger and the intercooler are connected by the hose with a gap therebetween.

According to a conventional connection structure of the turbocharger and the intercooler, however, the compressed air moves with high speed and generates flow noise. At the instant time, the flow noise is emitted toward the hose having low density.

To solve the present problem, a resonator is mounted between the turbocharger and the intercooler according to conventional arts, thereby increasing cost and weight.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a connection structure of a turbocharger and an intercooler for a vehicle having advantages of preventing vibration and noise occurring at an engine from being directly transmitted to the intercooler.

Various aspects of the present invention are directed to providing a connection structure of a turbocharger and an intercooler for a vehicle having further advantages of improving durability of the intercooler by preventing compressed air from directly contacting a hose.

Various aspects of the present invention are directed to providing a connection structure of a turbocharger and an intercooler for a vehicle having further advantages of prevent flow noise occurring when compressed air moves with high speed from being emitted to a hose.

According to an exemplary embodiment of the present invention, a connection structure of a turbocharger and an intercooler for a vehicle is disclosed.

The turbocharger may be configured to compress intake air using exhaust gas and may include an outlet for discharging the compressed air, and the intercooler may include an inlet connected to the outlet of the turbocharger and may be configured to receive the compressed air through the inlet.

An inserting portion having an external diameter smaller than an external diameter of the outlet may be formed at an end portion of the outlet facing the intercooler, and be inserted into the inlet of the intercooler such that the inlet encloses at least a portion of the end portion of the inserting portion.

The inserting portion may be spaced from the inlet in a radial internal direction thereof, and an intercooler hose may enclose external circumferences of the outlet and the inlet such that the outlet and the inlet are connected to each other through the intercooler hose.

An insertion groove may be formed on an internal circumference of an end portion of the inlet of the intercooler, and a protector may be fitted in the insertion groove to face the end portion of the external circumference of the inserting portion.

The protector may be spaced from the end portion of the external circumference of the inserting portion.

The protector may have an annular shape and be made of flexible material.

At least two mounting grooves may be formed at a middle portion of the internal circumference of the intercooler hose, at least one mounting protrusion may be formed at each of the external circumference of the outlet of the turbocharger and the external circumference of the inlet of the intercooler, and at least one mounting protrusion of the external circumference of the outlet and at least one mounting protrusion of the external circumference of the inlet may be fitted into the mounting grooves such that the outlet and the inlet are connected to each other through the intercooler hose.

At least one fixing rib may be protruded from each of the external circumference of the outlet of the turbocharger and the external circumference of the inlet of the intercooler, and both end portions of the intercooler hose may be fixed by the fixing ribs.

Each of the fixing ribs may be formed by a predetermined length along the external circumference of the outlet or the inlet.

The intercooler hose may be fixed to the outlet or the inlet by at least one band bracket enclosing an external circumference of the intercooler hose.

A stepped surface may be formed between the outlet and the inserting portion, and the stepped surface may be spaced from an end portion of the inlet.

According to an exemplary embodiment of the present invention, vibration and noise from an engine may be prevented from being directly transmitted to an intercooler by connecting a turbocharger and the intercooler through a hose of rubber material with a space being formed between the turbocharger and the intercooler.

According to an exemplary embodiment of the present invention, flow noise by compressed air may be prevented from being emitted to a hose by inserting an inserting portion of a turbocharger having smaller diameter in an inlet of an intercooler.

According to an exemplary embodiment of the present invention, compressed air is prevented from directly contacting with a rubber hose by mounting a protector between an inserting portion and an inlet.

Accordingly, durability of an intercooler may be improved according to an exemplary embodiment of the present invention.

Other effects obtainable or predictable from the exemplary embodiments of the present invention will be explicitly or implicitly described in a DETAILED DESCRIPTION section. That is, various effects predictable from the exemplary embodiments of the present invention will be described in the DETAILED DESCRIPTION section.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
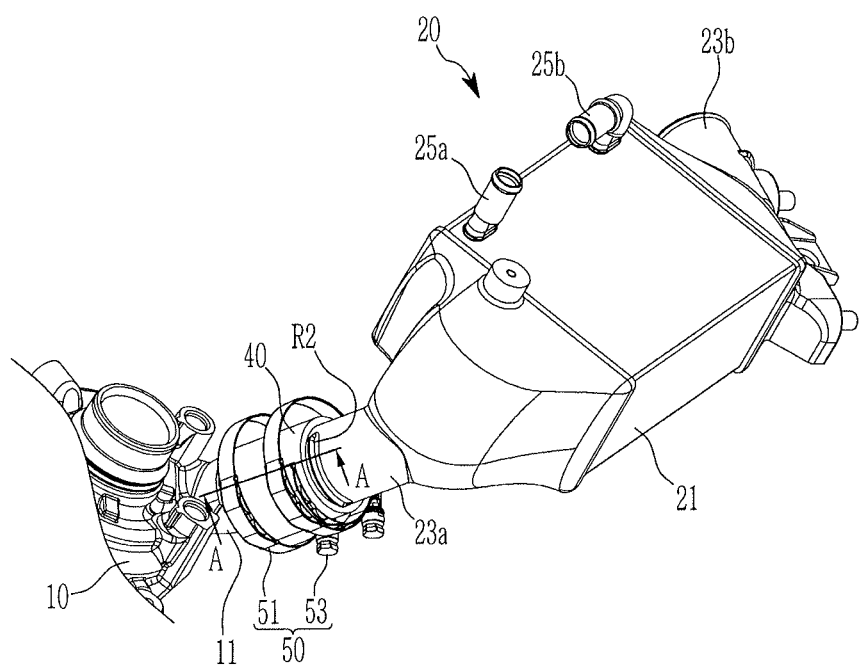
FIG. 1 is a perspective view of an assembled state of a turbocharger and an intercooler of a vehicle according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Exemplary embodiments of the present application will be described more fully hereinafter with reference to the accompanying drawings, in which exemplary embodiments of the invention are shown. As those skilled in the art would realize, the described embodiments may be modified in various different ways, all without departing from the spirit or scope of the present invention.

However, parts which are not related with the description are omitted for clearly describing the exemplary embodiments of the present invention and like reference numerals refer to like or similar elements throughout the specification.

In the following description, dividing names of components into first, second and the like is to divide the names because the names of the components are the same as each other and an order thereof is not particularly limited.

Figure 2:
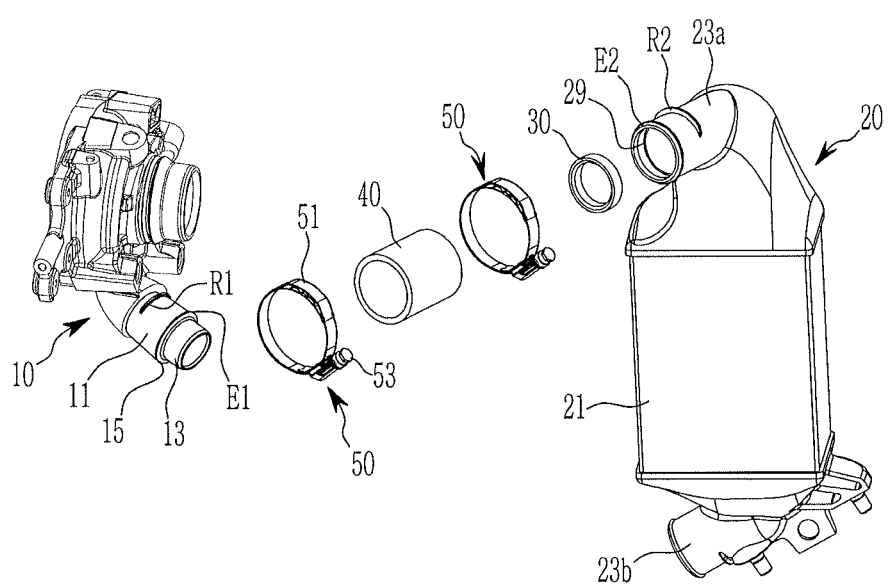
FIG. 2 is an exploded perspective view of a turbocharger and an intercooler of a vehicle according to an exemplary embodiment of the present invention.
Figure 3:
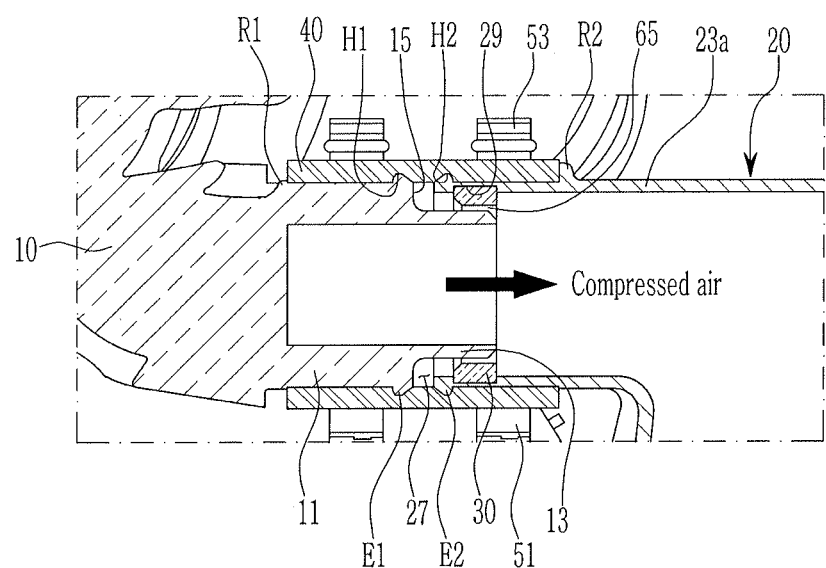
FIG. 3 is a cross-sectional view taken along a line A-A in FIG. 1.

FIG. 1 is a perspective view of an assembled state of a turbocharger and an intercooler of a vehicle according to an exemplary embodiment of the present invention, FIG. 2 is an exploded perspective view of a turbocharger and an intercooler of a vehicle according to an exemplary embodiment of the present invention, and FIG. 3 is a cross-sectional view taken along a line A-A in FIG. 1.

Referring to FIG. 1, a connection structure of a turbocharger and an intercooler according to an exemplary embodiment of the present invention is used to connect the turbocharger 10 connected to an engine of a vehicle to increase engine output with the intercooler 20.

The turbocharger 10 includes a turbine wheel and a compressor connected to the turbine wheel. The turbine wheel is mounted at an exhaust line and the compressor is mounted at an intake line.

Exhaust gas discharged from the engine rotates the turbine wheel while passing through the exhaust line, and the compressor also rotates to draw external air as the turbine wheel rotates.

At the instant time, the turbocharger 10 compresses the drawn in air and causes the compressed air to flow toward the intercooler 20. The compressed air is cooled by the intercooler 20 and then flows to the engine.

Here, a connecting hose (i.e., intercooler hose) 40 which encloses the turbocharger 10 and the intercooler 20 is used at a connecting portion of the turbocharger 10 and the intercooler 20.

A plurality of band brackets 50 enclose an external circumference of the connecting hose 40 to fix the connecting hose 40 on the turbocharger 10 and the intercooler 20.

Referring to FIG. 2 and FIG. 3, the connection structure of a turbocharger and an intercooler will be described in further detail.

The turbocharger 10 is provided with an outlet 11 for discharging the compressed air to the intercooler 20. The outlet 11 is integrally formed with the turbocharger 10. A first fixing rib R1 for fixing the connecting hose 40 is formed at an external circumference of the outlet 11. The first fixing rib R1 protrudes from the external circumference of the outlet 11.

In an exemplary embodiment of the present invention, two fixing ribs R1 and R2 are slanted in opposite direction to each other.

An inserting portion 13 is integrally formed with an end portion of the outlet 11 toward the intercooler 20. A diameter of the inserting portion 13 is smaller than that of another portion of the outlet 11. That is, the turbocharger 10 is provided with the outlet 11 for discharging the compressed air, and the end portion of the outlet 11 is integrally formed with the inserting portion 13 having the diameter smaller than that of the outlet 11. Therefore, a stepped surface 15 is formed at a boundary between the outlet 11 and the inserting portion 13.

Furthermore, a first mounting protrusion E1 which is fitted into the connecting hose 40 is formed at the external circumference of the outlet 11. The first mounting protrusion E1 protrudes from the external circumference of the outlet 11.

A diameter of an internal circumference of the outlet 11 may be the same as that of an internal circumference of the inserting portion 13. The internal circumference of the outlet 11 and the internal circumference of the inserting portion 13 form an internal passage through which the compressed air flows.

Since constituent elements of the turbocharger 10 are well-known to a person of an ordinary skill in the art, detailed description thereof will be omitted.

The intercooler 20 is configured to lower temperature of the compressed air supplied from the turbocharger 10. Various types of intercoolers 20 may be used, but a water-cooled intercooler is exemplified in the exemplary embodiment for ease of description.

The intercooler 20, as shown in FIG. 1, includes a housing 21, and an air passage through which the compressed air flows and a coolant passage through which a coolant flows are formed in the housing 21.

Furthermore, the intercooler 20 includes an inlet 23a which is connected to the air passage and receives the compressed air and a discharging portion 23b which is connected to the air passage and discharges the compressed air. The intercooler 20 further includes a coolant inflow portion 25a which is connected to the coolant passage and receives the coolant and a coolant discharging portion 25b which is connected to the coolant passage and discharges the coolant. The intercooler 20 cools the compressed air of high temperature by heat-exchange with the coolant and then discharges the cooled compressed air to the engine.

Here, the inlet 23a of the intercooler 20 is connected to the outlet 11 of the turbocharger 10 through the connecting hose 40.

An external diameter of the inlet 23a may be the same as that of the outlet 11.

Furthermore, an internal diameter of the inlet 23a is greater than the external diameter of the inserting portion 13.

Furthermore, a second fixing rib R2 corresponding to the first fixing rib R1 is formed on the external circumference of the inlet 23a. The second fixing rib R2 may be protruded from the external circumference of the inlet 23a.

Similarly, a second mounting protrusion E2 corresponding to the first mounting protrusion E1 is formed at an end portion of the inlet 23a toward the turbocharger 10. The second mounting protrusion E2 may be protruded from the external circumference of the inlet 23a.

The inserting portion 13 of the turbocharger 10 is inserted into the inlet 23a of the intercooler 20 and the stepped surface 15 is spaced from an end portion of the inlet 23a with a predetermined distance. That is, a space 27 is formed between the outlet 11 and the inlet 23a.

Furthermore, an insertion groove 29 is formed along the internal circumference of the inlet 23a. The insertion groove 29 is a groove in which the protector 30 is mounted. The insertion groove 29 may be formed to face the external circumference of the end portion of the inserting portion 13 in a radial direction thereof.

Furthermore, the protector 30 mounted in the insertion groove 29 is spaced from the external circumference of the inserting portion 13 by a gap 65. Therefore, the outlet 11 of the turbocharger 10 and the inlet 23a of the intercooler 20 may be easily assembled through the connecting hose 40. The protector 30 has an annular shape and is made of flexible material such as rubber.

The outlet 11 of the turbocharger 10 and the inlet 23a of the intercooler 20 are connected to each other through the connecting hose 40 enclosing them.

Two mounting grooves H1 and H2 are formed at a middle portion of an internal circumference of the connecting hose 40.

In an exemplary embodiment of the present invention, each of mounting grooves H1 and H2 is slanted in opposite direction to each other.

In an exemplary embodiment of the present invention, the slanted direction of first fixing ribs R1 and the mounting groove H1 are in opposite direction to each other.

In an exemplary embodiment of the present invention, the slanted direction of second fixing ribs R2 and the mounting groove H2 are in opposite direction to each other.

The first mounting protrusion E1 of the outlet 11 and the second mounting protrusion E2 of the inlet 23a are fitted respectively into the mounting grooves H1 and H2 of the connecting hose 40. That is, the first mounting groove H1 and the second mounting groove H2 are formed at the middle portion of the internal circumference of the connecting hose 40, wherein the first mounting groove H1 corresponds to the first mounting protrusion E1 of the outlet 11 and the second mounting groove H2 corresponds to the second mounting protrusion E2 of the inlet 23a.

It is exemplified that the first and second mounting protrusions E1 and E2 are fitted into the first and second mounting grooves H1 and H2 formed at the middle portion of the internal circumference of the connecting hose 40 according to the exemplary embodiment of the present invention. However, the connecting hose 40 according to various exemplary embodiments of the present invention may not be provided with the first and second mounting groove H1 and H2. That is, the outlet 11 and the inlet 23a may be press-fitted into the connecting hose 40 without the first and second mounting protrusions E1 and E2 and the first and second mounting grooves H1 and H2.

Both end portions of the connecting hose 40 are supported by the first fixing rib R1 formed at the external circumference of the outlet 11a and the second fixing rib R2 formed at the external circumference of the inlet 23a.

Herein, the first and second fixing ribs R1 and R2 may be formed by a predetermined length along the external circumferences of the outlet 11 and the inlet 23a, or may be formed along the entire external circumferences of the outlet 11 and the inlet 23a.

As the connecting hose 40 are fixed by the mounting protrusions E1 and E2 and the fixing ribs R1 and R2, the space 27 is formed between the outlet 11 and the inlet 23a in an axial direction and between the connecting hose 40 and the inserting portion 13 in the radial direction thereof.

The connecting hose 40 has a pipe shape with a predetermined length and is made of flexible material such as rubber. The connecting hose 40 is fixed by the plurality of band brackets 50 enclosing the external circumference of the connecting hose 40.

The band bracket 50 includes a flexible band 51 and a fastening bolt 53, and the fastening bolt 53 is configured to vary a diameter of the flexible band 51.

It is exemplified in the exemplary embodiment of the present invention that two band brackets 50 are used, but the number of band brackets 50 is not limited to 2. Size and the number of the band brackets 50 may be changed as occasion demands.

The connection structure of the turbocharger and the intercooler for the vehicle according to the exemplary embodiment of the present invention may prevent vibration and noise occurring at the engine from being directly transmitted to the intercooler 20 by the connecting hose 40.

The connection structure of the turbocharger and the intercooler for the vehicle according to the exemplary embodiment of the present invention may prevent may prevent flow noise generated by flow of the compressed air from being emitted toward the connecting hose 40 since the inserting portion 13 of the turbocharger 10 is inserted into the inlet 23a of the intercooler 20 by a predetermined length. Furthermore, the flow noise is prevented from being directly emitted to the connecting hose 40 having a low density by disposing the protector 30 between the inserting portion 13 and the inlet 23a.

The connection structure of the turbocharger and the intercooler for the vehicle according to the exemplary embodiment of the present invention may prevent friction and interference between the turbocharger 10 and the intercooler 20 by the protector 30 and the space 27 between the outlet 11 and the inlet 23a.

Since the connection structure of the turbocharger and the intercooler for the vehicle according to the exemplary embodiment of the present invention can remove a conventional resonator for reducing the flow noise, cost and weight may be reduced and the connection structure of the turbocharger 10 and the intercooler 20 may be compact.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the claims appended hereto and their equivalents.

What is claimed is:

1. A connection structure for coupling a turbocharger compressing intake air using exhaust gas and having an outlet for discharging the compressed air therethrough and an intercooler including an inlet connected to the outlet of the turbocharger and receiving the compressed air through the inlet from the turbocharger for a vehicle, the connection structure comprising:
   an inserting portion having an external diameter smaller than an external diameter of the outlet, formed at an end portion of the outlet facing the intercooler, inserted into the inlet of the intercooler such that the inlet encloses at least a portion of an end portion of the inserting portion, and spaced from the inlet in a radial internal direction thereof; and
   a connecting hose enclosing external circumferences of the outlet and the inlet, the outlet and the inlet connected to each other through the connecting hose.

2. The connection structure of claim 1,
   wherein the inlet of the intercooler includes an insertion groove formed on an internal circumference of an end portion of the inlet of the intercooler, and
   wherein a protector is fitted in the insertion groove to face the end portion of the external circumference of the inserting portion.

3. The connection structure of claim 2, wherein the protector is spaced from the end portion of the external circumference of the inserting portion with a gap in a radial internal direction of the inserting portion.

4. The connection structure of claim 2, wherein the protector has an annular shape and is made of flexible material.

5. The interconnection structure of claim 1,
   wherein at least two mounting grooves are formed at a portion of an internal circumference of the connecting hose,
   wherein at least one mounting protrusion is formed at each of the external circumference of the outlet of the turbocharger and the external circumference of the inlet of the intercooler, and
   wherein the at least one mounting protrusion formed on the external circumference of the outlet and the at least one mounting protrusion formed on the external circumference of the inlet are fitted into the at least mounting grooves, respectively such that the outlet and the inlet are connected to each other through the connecting hose.

6. The connection structure of claim 5, wherein the at least one mounting protrusion formed on the external circumference of the outlet and the at least one mounting protrusion formed on the external circumference of the inlet are slanted in an opposite direction to each other.

7. The connection structure of claim 6,
   wherein at least two fixing ribs are protrudingly formed at each of the external circumference of the outlet of the turbocharger and the external circumference of the inlet of the intercooler,
   wherein distal ends of first and second end portions of the connecting hose are fixed by the at least two fixing ribs,
   wherein a slanting direction of a fixing rib formed at the external circumference of the outlet of the turbocharger among the at least two fixing ribs is opposite to a slanting direction of the at least one mounting protrusion formed on the external circumference of the outlet, and
   wherein a slanting direction of a fixing rib formed at the external circumference of the inlet of the turbocharger among the at least two fixing ribs is opposite to a slanting direction of the at least one mounting protrusion formed on the external circumference of the inlet.

8. The connection structure of claim 1,
   wherein at least two fixing ribs are protrudingly formed from each of the external circumference of the outlet of the turbocharger and the external circumference of the inlet of the intercooler, and
   wherein first and second distal ends of the connecting hose are fixed by the at least two fixing ribs, respectively.

9. The connection structure of claim 8, wherein the at least two fixing ribs are slanted in an opposite direction to each other.

10. The connection structure of claim 8, wherein each of the fixing ribs is formed in a predetermined length therebetween along the external circumference of the outlet or the inlet.

11. The connection structure of claim 1, wherein the connecting hose is fixed to the outlet by at least one band bracket enclosing an external circumference of the connecting hose.

12. The connection structure of claim 1, wherein the connecting hose is fixed to the inlet by at least one band bracket enclosing an external circumference of the connecting hose.

13. The connection structure of claim 1, wherein a stepped surface is formed between the outlet and the inserting portion of the turbocharger, and the stepped surface is spaced from an end portion of the inlet.

14. The connection structure of claim 13, wherein a mounting protrusion is formed at an edge of the stepped surface.

15. The connection structure of claim 1, wherein a mounting protrusion is formed at a distal end of the inlet.

\* \* \* \* \*